United States Patent
Kwon

(10) Patent No.: US 8,371,172 B2
(45) Date of Patent: Feb. 12, 2013

(54) METHOD AND SYSTEM FOR PREDICTING ACOUSTIC FIELDS BASED ON GENERALIZED MOVING FRAME ACOUSTIC HOLOGRAPHY

(75) Inventor: Hyu-Sang Kwon, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 644 days.

(21) Appl. No.: 12/482,636

(22) Filed: Jun. 11, 2009

(65) Prior Publication Data

US 2010/0036622 A1 Feb. 11, 2010

(30) Foreign Application Priority Data

Aug. 7, 2008 (KR) ................ 10-2008-0077304

(51) Int. Cl.
*G03H 3/00* (2006.01)

(52) U.S. Cl. ................ 73/603; 367/8; 359/901

(58) Field of Classification Search ............ 73/603–605; 367/7–10; 359/901
See application file for complete search history.

(56) References Cited

U.S. PATENT DOCUMENTS

| 3,655,258 A * | 4/1972 | Hildebrand | 359/9 |
| 5,675,550 A * | 10/1997 | Ekhaus | 367/7 |
| 5,986,971 A * | 11/1999 | Kim et al. | 367/8 |
| 2004/0151066 A1 * | 8/2004 | Kim et al. | 367/8 |

FOREIGN PATENT DOCUMENTS

| JP | 61050014 A | * | 3/1986 |
| JP | 04331393 A | * | 11/1992 |

* cited by examiner

*Primary Examiner* — Peter Macchiarolo
*Assistant Examiner* — Rose M Miller
(74) *Attorney, Agent, or Firm* — The Webb Law Firm

(57) ABSTRACT

A method and system for predicting acoustic fields based on generalized moving frame acoustic holography are disclosed. The method includes acquiring a first wavenumber spectrum on a measurement plane according to a moving coordinate system, converting the first wavenumber spectrum to a second wavenumber spectrum on a reference coordinate system using a relative velocity between the measurement plane and a medium, converting the second wavenumber spectrum to a third wavenumber spectrum on a prediction plane using an acoustic wave propagation theory, converting the third wavenumber spectrum to a fourth wavenumber spectrum on a moving coordinate system using a relative velocity between the medium and the prediction plane, and computing acoustic fields on the prediction plane using the fourth wavenumber spectrum.

6 Claims, 5 Drawing Sheets

METHOD AND SYSTEM FOR PREDICTING ACOUSTIC FIELDS BASED ON GENERALIZED MOVING FRAME ACOUSTIC HOLOGRAPHY

BACKGROUND OF THE INVENTION

1. Field of the Invention

The present invention relates to a method and system for predicting acoustic fields, and more particularly to a method and system for accurately predicting acoustic fields on a prediction plane based on a source plane, a medium, and a measurement plane that make a relative movement.

2. Description of the Related Art

Many techniques for acquiring the hologram of acoustic fields using sound pressure measurements and deriving information about a sound source from the hologram have been proposed in both private and military sectors. Farfield directivity information, nearfield vector intensity information, surface velocity information, total sound power information, etc. can be obtained from the hologram of acoustic fields. A technology for detecting the location and strength of a sound source by using the hologram of acoustic fields may be used to find enemies in military applications and to detect and eliminate a noise source or build a noise wall in civilian industry sectors. Especially along with the recent increased attention towards the environment and living standards, there exists an increasing need for appropriately dealing with noise sources based on accurate information about the noise source.

Many acoustic holography techniques have been proposed. Some of the acoustic holography techniques are disclosed in J. D. Maynard, E. G. Williams, and Y. Lee "NearField Acoustic Holography (NAH): I. Theory of Generalized Holography and the Development of NAH", *Journal of the Acoustical Society of America*, Vol. 74, No. 4, pp. 1395-1413 (1985), W. A. Veronesi and J. D. Maynard "NearField Acoustic Holography (NAH): II. Holographic Reconstruction Algorithms and Computer Implementation", *Journal of the Acoustical Society of America*, Vol. 81, No. 5, pp. 1307-1322(1988), U.S. Pat. No. 4,415,996 entitled "Nonwavelength-Limited Holographic Acoustic field Reconstruction" by J. D. Maynard and E. G. Williams, J. Hald "Method of Spatial Transformation of Acoustic fields—A Unique Technique for Scan-Based Near-Field Acoustic Holography Without Restrictions on Coherence" *Technical Review* No. 1, 1989, BK publication, and Loyau, J. C. Pascal, and P. Galliard, "Broadband Acoustic Holography Reconstruction from Acoustic Intensity Measurement" *Journal of the Acoustical Society of America*, Vol. 84, No. 5, pp. 1744-1750 (1988).

Acoustic Holography (AH) is a technology for obtaining a hologram on a reference plane called a hologram plane and estimating the properties of sound waves at all spatial positions of interest by analyzing the hologram.

FIG. 1 conceptually illustrates a conventional AH technique. Referring to FIG. 1, the AH technique measures spatial acoustic fields, namely a hologram, using a microphone array having a plurality of microphones on an arbitary plane and estimates a spatial distribution of acoustic fields from the hologram. This AH technique is based on acoustic field mode interpretation that relies on a spatial Fourier transform based on the Kirchhoff-Hehmholts integral equation that is an acoustical interpretation theory of phase-coherent acoustic fields.

Now a description will be made of a Moving Frame Acoustic Holography (MFAH) technique proposed to improve the conventional AH technique. Before the MFAH technique was proposed, conventional measurement schemes required that the spatial position between the microphone array and the sound source should be fixed. Therefore, errors were inevitable when the sound source moved. Also, when air being an acoustic medium flows, the conventional measurement schemes have limitations in their application. Although studies were continuously conducted on the issue, no specific solution was found. In this context, the present inventors proposed an MFAH technique based on a single linear array for the first time, and a patent was granted for their MFAH technique (Korea Patent No. 217872). For details, see H.-S. Kwon and Y.-H. Kim, "Moving Frame Technique for Planar Acoustic Holography", *J. Acoust. Soc. Am.*, Vol. 103, No. 4, pp. 1734-1741(1998).

The MFAH technique estimates spatial information about a sound source using temporal data from sound pressure measurements according to the constant-velocity relative movement relationship between the sound source and microphones. With the use of known frequency and velocity information, a time-space variation is detected based on the idea that the Doppler shift reveals the time-space relationship. However, this MFAH technique derives a modulated wavenumber spectrum from a frequency spectrum. If modulated wavenumber spectra overlap because frequency components are close to each other, if a source plane or a prediction plane moves instead of a measurement plane, or if a medium moves, errors occur.

While the above MFAH technique is important in that it is the first to take into account the relative movement between a sound source and a hologram plane with regards to the conventional acoustic holography, it has many limitations in its effectiveness in real-world implementation, such as a normal-state acoustic field of a single frequency, the movement of measurement microphones, etc.

Especially when modulated wavenumber spectra overlap because frequency components are close to each other, when a source plane or a prediction plane moves instead of a measurement plane, or when a medium moves, severe problems are produced.

SUMMARY OF THE INVENTION

Therefore, the present invention has been made in view of the above problems, and it is an object of the present invention to provide a technique for accurately predicting acoustic fields on a prediction plane, taking into account the relative movement of a sound plane, a hologram plane, or a medium.

It is another object of the present invention to define coordinate conversion relationships, generalize the coordinate conversion relationships by formulation, and apply the generalized coordinate conversion relationships to an acoustic field prediction system.

To achieve the above and other objects, the present invention provides a technique for expressing a sound source and a medium, required for sound propagation and measurement points on different coordinate systems and describing all of their relative movements accordingly. Sound is propagated through the medium. Hence, a relative movement of another coordinate system is represented with respect to the coordinate system of the medium, such that acoustic fields are represented on the same coordinate system for which the relative movement is compensated for.

In accordance with the present invention, the above and other objects can be accomplished by the provision of a method for predicting acoustic fields on a prediction plane by measuring sound waves emitted from a sound source to a medium on a measurement plane that makes a relative movement with respect to the sound source, the method including acquiring a first wavenumber spectrum on the measurement plane according to a moving coordinate system, converting the first wavenumber spectrum to a second wavenumber spectrum on a reference coordinate system using a relative velocity between the measurement plane and the medium, converting the second wavenumber spectrum to a third wavenumber spectrum on the prediction plane using an acoustic wave propagation theory, converting the third wavenumber spectrum to a fourth wavenumber spectrum on a moving coordinate system using a relative velocity between the medium and the prediction plane, and computing acoustic fields on the prediction plane using the fourth wavenumber spectrum.

The first wavenumber spectrum acquisition may include performing a time-space Fourier transform on sound pressures measured on the measurement plane. The acoustic fields computation may include performing a time-space inverse Fourier transform on the fourth wavenumber spectrum.

In accordance with an aspect of the present invention, the above and other objects can be accomplished by the provision of a system for predicting acoustic fields on a prediction plane by measuring sound waves emitted from a sound source to a medium on a measurement plane that makes a relative movement with respect to the sound source, the system including a microphone array having a plurality of microphones, for measuring sound waves on the measurement plane, and an acoustic field prediction module for predicting acoustic fields on the prediction plane using the measurements received from the microphone array. The acoustic field prediction module acquires a first wavenumber spectrum on the measurement plane according to a moving coordinate system, converts the first wavenumber spectrum to a second wavenumber spectrum on a reference coordinate system using a relative velocity between the measurement plane and the medium, converts the second wavenumber spectrum to a third wavenumber spectrum on the prediction plane using an acoustic wave propagation theory, converts the third wavenumber spectrum to a fourth wavenumber spectrum on a moving coordinate system using a relative velocity between the medium and the prediction plane, and computes acoustic fields on the prediction plane using the fourth wavenumber spectrum.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Exemplary embodiments of the present invention relate to a technique for receiving sound waves propagated from a sound source through a medium on a hologram plane (i.e. a measurement plane) and predicting acoustic fields on a prediction plane using the sound waves.

Specific features of the present invention will be made apparent by exemplary embodiments of the present invention described later. A description will be made of the exemplary embodiments of the present invention with reference to the attached drawings.

Figure 1:
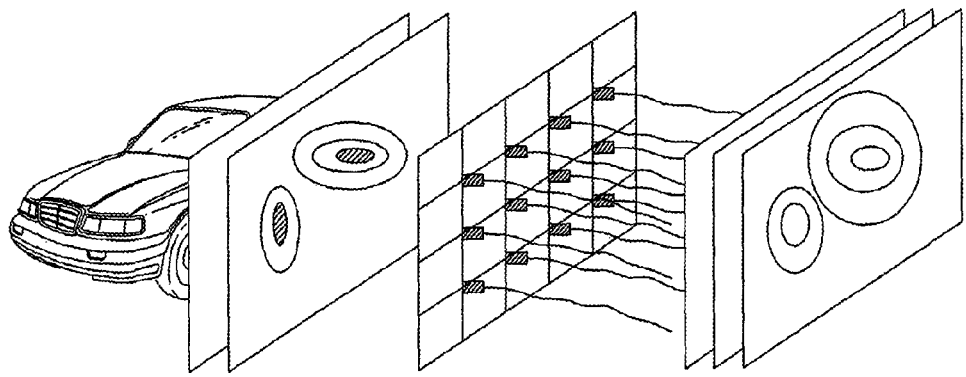
FIG. 1 conceptually illustrates a conventional AH technique.
Figure 2:
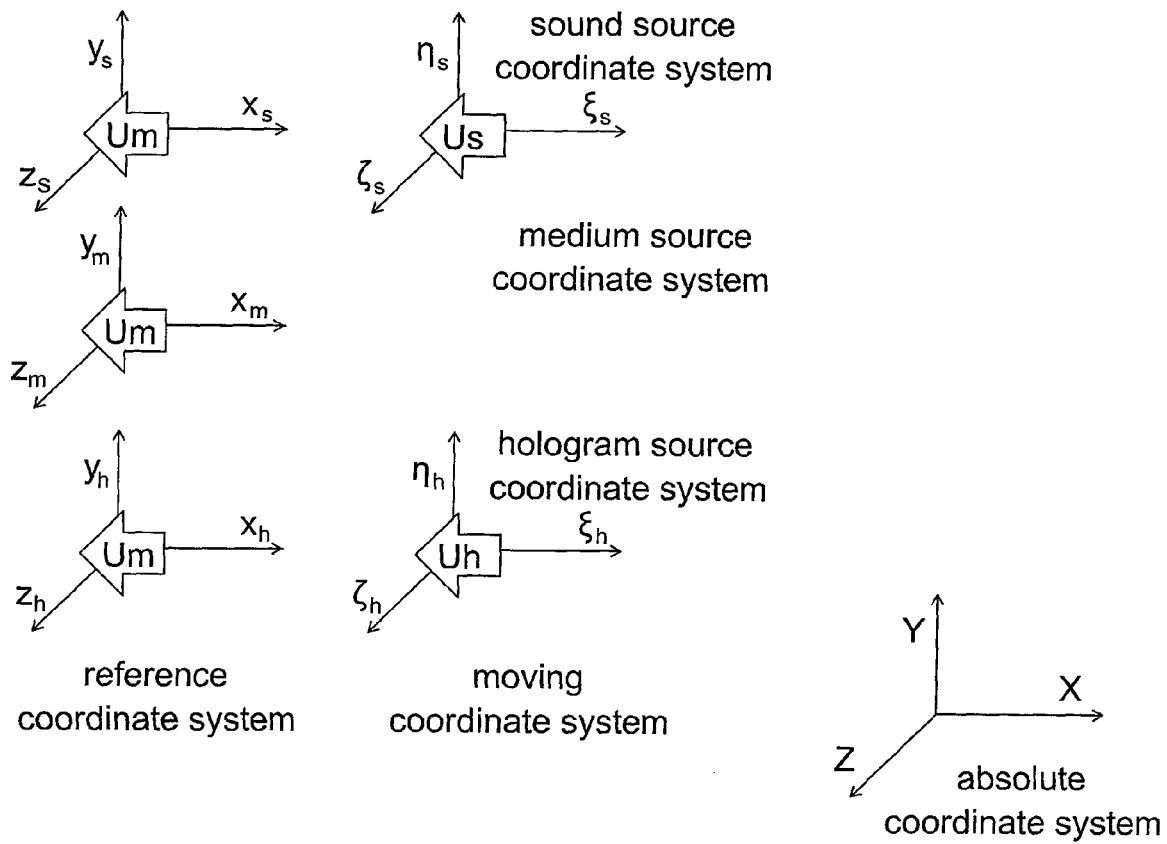
FIG. 2 illustrates a sound source coordinate system, a medium coordinate system, and a hologram coordinate system with respect to the Cartesian coordinate system.

FIG. 2 illustrates a sound source coordinate system, a medium coordinate system, and a hologram coordinate system with respect to a Cartesian coordinate system. In the conventional AH technique, sound waves are interpreted as independent sound waves between parallel planes. For the convenience of description, coordinate systems are shown with respect to the Cartesian coordinate system in FIG. 2. However, it is clear to those skilled in the art that the exemplary embodiment of the present invention is applicable to various orthogonal coordinate systems such as a cylindrical coordinate system, a spherical coordinate system, and the like.

With regards to movement of a sound source or measurement points, movements of two planes and a movement of a medium between the two planes may be represented. It may be assumed that all movements are made linearly at a constant velocity and directed along an x axis, in view of the nature of coordinate systems. Hereafter, for each coordinate system, a reference coordinate system is represented as (x, y, z) and a moving coordinate system that is synchronized to a movement of the sound source or the measurement points is represented as (ξ, η, ζ). To indicate the sound source coordinate system, the medium coordinate system, and the hologram coordinate system, subscripts s, m, h are used, respectively.

Referring to FIG. 2, regarding the relative movement of each coordinate system, a sound source plane and a hologram plane are parallel to each other in a surface-to-surface conversion relationship. The medium is the space between the two planes, through which sound waves are actually propagated. Therefore, the behavior of sound waves may be interpreted with respect to the medium. In this context, a coordinate system synchronized to the movement of the medium is set as a reference, thus called a reference coordinate system and sound waves are interpreted on the reference coordinate system.

When the medium does not move, i.e. there is no flow in the medium, the reference coordinate system is fixed. In this case, a fixed-moving coordinate system conversion is performed for the movement of the sound source or the hologram in each coordinate system.

The same applies to the case where the medium moves at a constant speed. In this case, the behavior of all sound waves are interpreted and represented on the reference coordinate system that moves together with the medium. Acoustic fields of another moving coordinate system may be represented on a coordinate system relative to the reference coordinate system.

For the source plane, a moving coordinate system fixed to the sound source may be represented as a relative coordinate system that makes a $U_s - U_m$ relative movement ($U_s$ is the velocity of the source and $U_m$ is the velocity of the medium, with respect to an absolute coordinate system). Similarly for the hologram plane (the velocity of the hologram is expressed as $U_h$ with respect to the absolute coordinate system), a moving coordinate system fixed to the positions of the measurement points may be represented as a relative coordinate system by which to represent a relative movement with respect to the medium.

With the introduction of the relative coordinate systems, the behavior of all sound waves may be expressed as acoustic fields on a reference coordinate system synchronized to the movement of the medium and acoustic fields in a real coordinate system (a coordinate system observed by an observer) and the relationship between these coordinate systems may be clarified.

A description will be made of an example of predicting acoustic fields on the measurement plane using the sound pressures measured on the hologram plane based on the reference coordinate system, the relative coordinate systems of the moving coordinate systems, and the coordinate conversion relationships.

Figure 3:
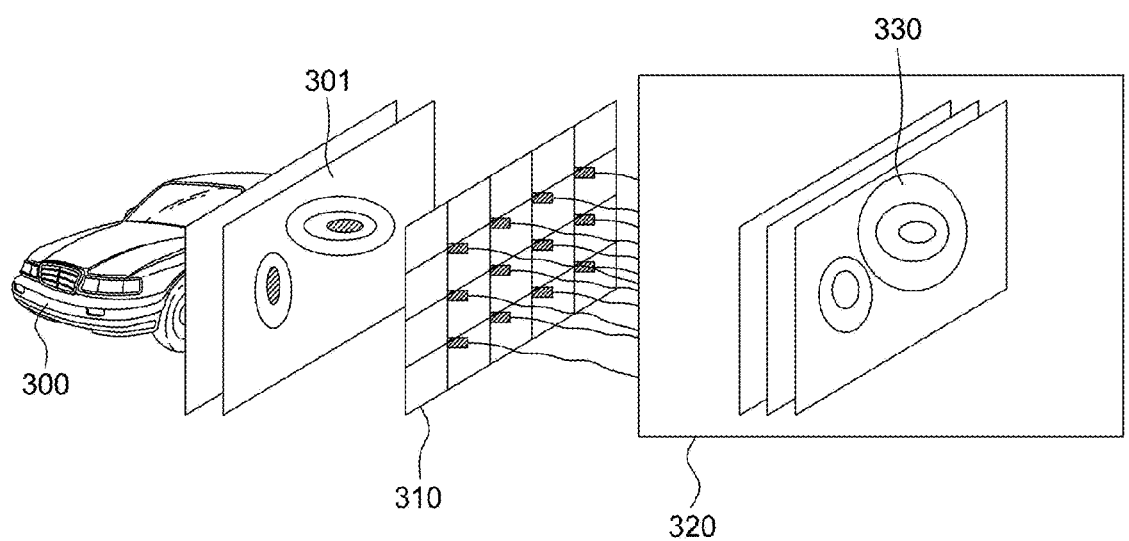
FIG. 3 illustrates an acoustic field prediction system according to an exemplary embodiment of the present invention.

FIG. 3 illustrates an acoustic field prediction system according to an exemplary embodiment of the present invention. Referring to FIG. 3, a sound source 300 emits sound waves having various wavelengths. As these sound waves propagate through a medium, they may be analyzed as acoustic fields 301. A microphone array 310 is a measurement device having a plurality of microphones, which may measure sound pressure on a hologram plane (i.e. a measurement plane) determined by the position of the microphone array 310. The microphone array 310 may be formed into various configurations, for example, a two-dimensional array, a linear one-dimensional array, or an arc-shaped one-dimensional array.

In FIG. 3, an acoustic field prediction module 320 receives sound pressure measurements from the microphone array 310 and performs an operation for predicting acoustic fields on an arbitrary prediction plane using the sound pressure measurements. The prediction plane may be determined in various ways, but is generally or primarily determined to be a sound source plane on which the sound source 300 is placed. That is, the acoustic field prediction module 320 may predict acoustic fields on the source plane. Hereinafter, a description will be made of a case where the source plane is determined as the prediction plane, by way of example.

Figure 4:
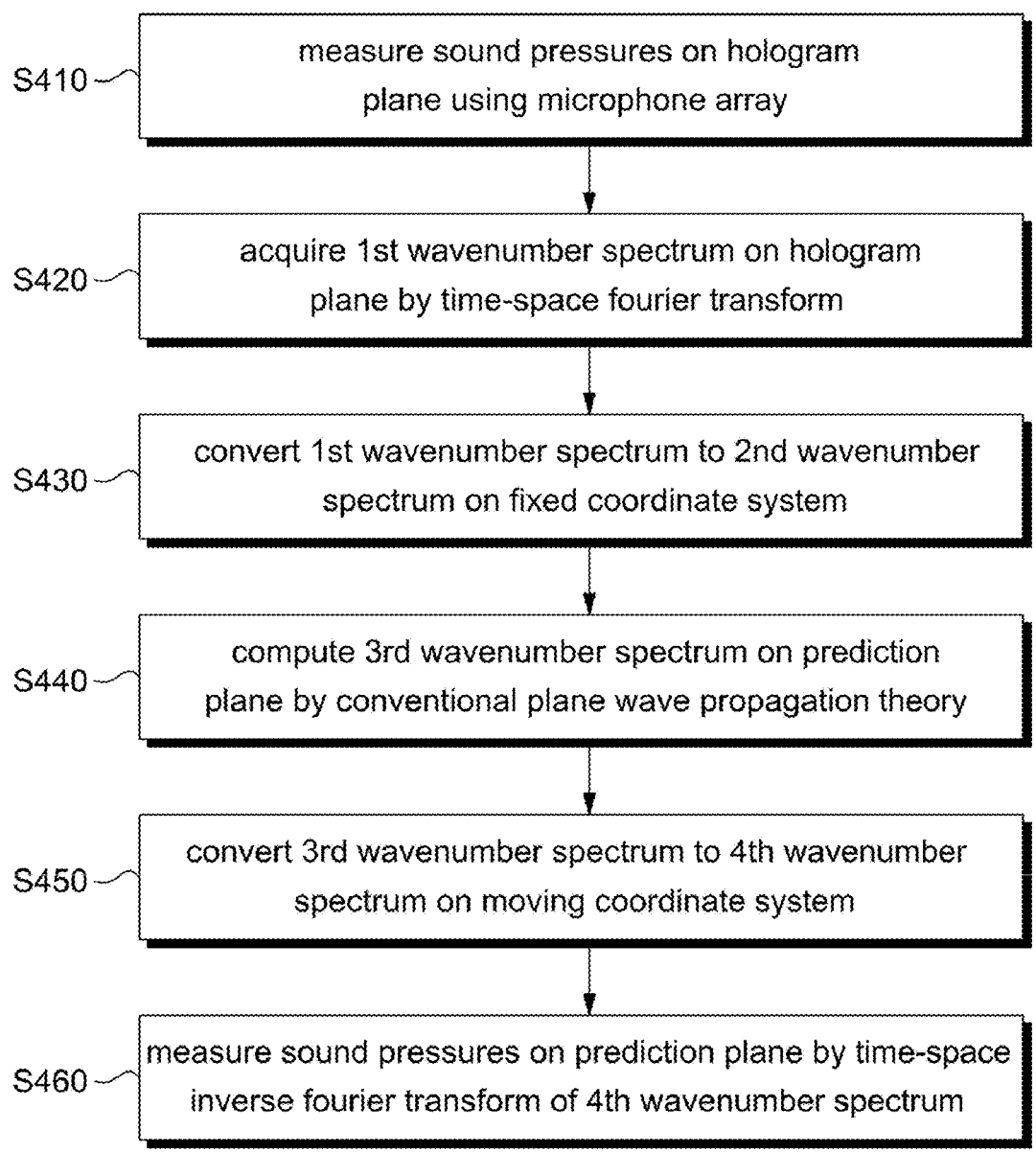
FIG. 4 is a flowchart illustrating an operation performed by the acoustic field prediction system illustrated in FIG. 3.

FIG. 4 is a flowchart illustrating an operation performed by the acoustic field prediction system illustrated in FIG. 3.

Referring to FIG. 4, sound pressures on the hologram plane are measured through the microphone array 310 in step S410. In step S420, a wavenumber spectrum may be obtained on the measurement plane by a time-space Fourier transform of the sound pressure measurements. For the convenience of description, the wavenumber spectrum on the hologram plane (i.e. the measurement plane) is referred to as a first wavenumber spectrum.

In accordance with the exemplary embodiment of the present invention, since the source plane, the medium, or the measurement plane makes a relative movement, sound waves may be analyzed by converting the various coordinate systems illustrated in FIG. 2. Specifically, all coordinate systems are based on the movement of the medium. A coordinate system that moves in synchronization to the movement of the medium is called "a reference coordinate system".

For this purpose, conversion to an (x, y, z) coordinate system synchronized to the velocity $U_m$ of the medium is performed. That is, the first wavenumber spectrum is converted to a wavenumber spectrum on the reference coordinate system in step S430. For the convenience of description, the result from converting the first wavenumber spectrum to the wavenumber spectrum on the reference coordinate system is referred to as a second wavenumber spectrum.

Because the first and second wavenumber spectrums are wavenumber spectrums on the hologram plane (i.e. the measurement plane), they need to be represented on the source plane (i.e. the prediction plane). For this purpose, the second wavenumber spectrum is converted to a wavenumber spectrum on the prediction plane by a conventional acoustic wave propagation theory in step S440. This wavenumber spectrum on the prediction plane is referred to as a third wavenumber spectrum, for the convenience of description. The third wavenumber spectrum is one represented on the reference coordinate system.

If the source plane (i.e. the prediction plane) moves according to $U_s$, the third wavenumber spectrum on the reference coordinate system may be represented on a coordinate system synchronized to the sound source. To do so, the third wavenumber spectrum is converted to a wavenumber spectrum on a moving coordinate system in step S450. For the convenience of description, the result from converting the third wavenumber spectrum to the wavenumber spectrum on the moving coordinate system is referred to as a fourth wavenumber spectrum.

In step S460, sound pressures on the prediction plane may be measured by an inverse Fourier transform of the fourth wavenumber spectrum.

Figure 5:
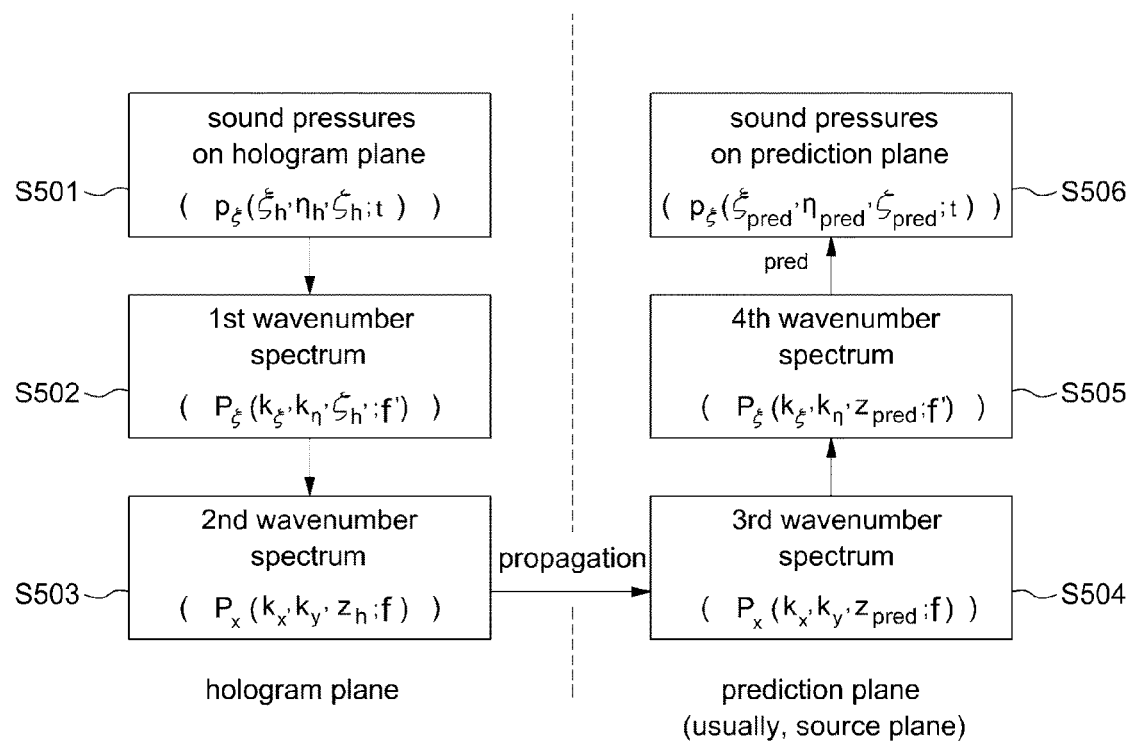
FIG. 5 is a block diagram illustrating an operation for measuring sound pressures on a prediction plane using sound pressures measured on a hologram plane (i.e. a measurement plane)

FIG. 5 is a block diagram illustrating an operation for measuring sound pressures on the prediction plane using sound pressures measured on the hologram plane (i.e. the measurement plane). Since FIG. 5 describes an exemplary case where a relative movement is made along the x axis, sound pressures and wavenumber spectrums are expressed only with respect to ξ and x axes. Yet, it is clear to those skilled in the art that the illustrated case of FIG. 5 is applicable to relative movements along various axes. Each step of FIG. 5 has its counterpart in FIG. 4. That is, the result of step S501 in FIG. 5 may be obtained by performing step S410 in FIG. 4.

Referring to FIG. 5, sound pressures $p_\xi(\xi_h, \eta_h, \zeta_h; t)$ on the hologram plane (the measurement plane) are measured through the microphone array 310 in step S501.

In step S502, the first wavenumber spectrum $P_\xi(k_\xi, k_\eta, \zeta_h; f)$ is obtained by a time-space Fourier transform of the measurements of the sound pressures $p_\xi(\xi_h, \eta_h, \zeta_h; t)$.

The first wavenumber spectrum $P_\xi(k_\xi, k_\eta, \zeta_h; f)$ is on a moving coordinate system and thus it is converted to a wavenumber spectrum on the reference coordinate system. That is, the second wavenumber spectrum $P_x(k_x, k_y, z_h; f)$ is computed in step S503. Generally, $z_h = \zeta_h$.

Then the third wavenumber spectrum $P_x(k_x, k_y, z_{pred}; f)$ is computed by an acoustic wave propagation theory in step S504. For details of the computation of a wavenumber spectrum by the acoustic wave propagation theory, refer to i) J. D. Maynard, E. G. Williams, and Y. Lee "Nearfield Acoustic Holography (NAH): I. Theory of Generalized Holography and the Development of NAH", *Journal of the Acoustical Society of America*, Vol. 74, No. 4, pp. 1395-1413(1985), ii) W. A. Veronesi and J. D. Maynard, "Nearfield Acoustic Holography (NAH): II Holographic Reconstruction Algorithms and Computer Implementation", *Journal of the Acoustical Society of America*, Vol. 81, No. 5, pp. 1307-1322 (1988), iii) J. Hald, "Method of Spatial Transformation of Acoustic fields—A Unique Technique for Scan-Based Near-Field Acoustic Holography Without Restrictions on Coherence", *Technical Review* No. 1, 1989, BK publication, and iv) H.-S. Kwon and Y.-H. Kim, "Moving Frame Technique for Planar Acoustic Holography", *J. Acoust. Soc. Am.*, Vol. 103, No. 4, pp. 1734-1741 (1998), which are well known to those skilled in the art and thus will not be described herein.

The third wavenumber spectrum $P_x(k_s, k_y, z_{pred}; f)$ is a wavenumber spectrum on the reference coordinate system and thus is converted to a wavenumber spectrum on a moving coordinate system. That is, the fourth wavenumber spectrum $P_\xi(k_\xi, k_\eta, z_{pred}; f)$ is computed in step S505.

In step S506, sound pressures $p_\xi(\xi_{pred}, \eta_{pred}, \zeta_{pred}; t)$ on the source plane (i.e. the prediction plane) are measured by a time-space inverse Fourier transform of the fourth wavenumber spectrum $P_\xi(k_\xi, k_\eta, z_{pred}; f')$. Generally, $z_{pred} = \zeta_{pred}$.

In the illustrated case of FIG. 5, the time-space Fourier transform and wavenumber spectrum conversion based on the acoustic wave propagation theory may be carried out conventionally. However, step 503, that is, the step of converting a wavenumber spectrum on a moving coordinate system to a wavenumber spectrum on the reference coordinate system, and step 505, that is, the step of converting a wavenumber spectrum on the reference coordinate system to a wavenumber spectrum on a moving coordinate system are performed as follows.

Figure 6:
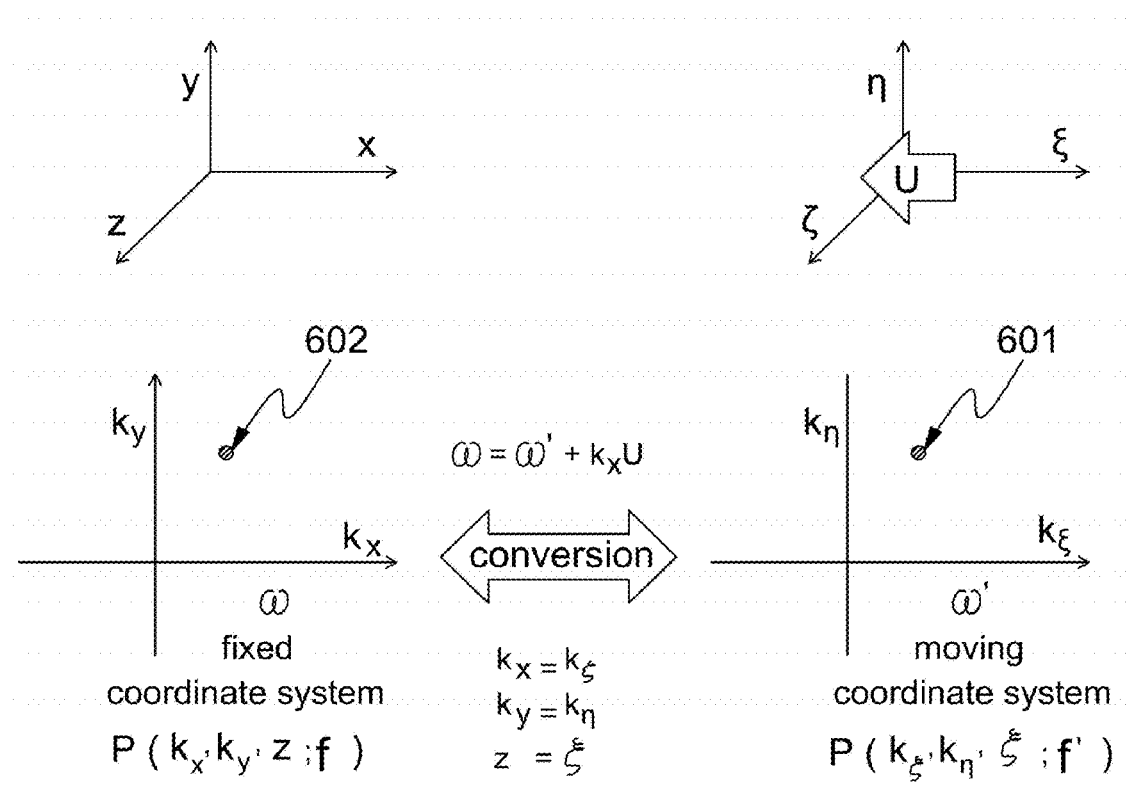
FIG. 6 illustrates a method for converting between a reference coordinate system and a moving coordinate system.

FIG. 6 illustrates a method for converting between coordinate systems that make a relative movement. While FIG. 6 describes the case of an x-axis relative movement by way of example, the illustrated case of FIG. 6 may apply to relative movements along various axes.

Referring to FIG. 6, the wavenumber spectrum relationship between coordinate systems that make relative movements lies in a recombination of frequency components and wavenumber components. When the medium and the hologram plane move together, the relative movement U of the hologram plane is expressed as $U_h - U_m$.

The conversion from the first wavenumber spectrum to the second wavenumber spectrum amounts to re-arrangement of spectrum components.

That is, a component 601 of the first wavenumber spectrum $P_\xi(k_\xi, k_\eta, \zeta_h; f')$ moves in the second wavenumber spectrum $P_x(k_x, k_y, z_h; f)$ according to $k_\xi = k_x$, $k_\eta = k_y$, and $$f = f' + \frac{k_x}{2\pi}U = f' + \frac{k_x}{2\pi}(U_h - U_m)$$

That is, the component 601 on the moving coordinate system also exists on the reference coordinate system, but at a different frequency from in the moving coordinate system. In other words, although the component 601 on the moving coordinate system has an equal wavenumber to that of a component 602 on the reference coordinate system, the frequency band of the wavenumber changes to $\omega = (2\pi f)$, not $\omega' = (2\pi f')$. In this case, the relationship between $\omega'$ and $\omega$ depends on the relative movement of the hologram plane, $U = (U_h - U_m)$.

The relationship between the first wavenumber spectrum $P_\xi(k_\xi, k_\eta, \zeta_h; f')$ and the second wavenumber spectrum $P_x(k_x, k_y, z_h; f)$ is expressed as $$P_x(k_x, k_y z_h; f) = P_\xi\left(k_\xi, k_\eta, \zeta_h; f' + \frac{k_\xi}{2\pi}(U_h - U_m)\right) \quad \text{[Equation 1]}$$

Now a description will be made of the relationship between the third wavenumber spectrum $P_x(k_x, k_y, z_{pred}; f)$ and the fourth wavenumber spectrum $P_\xi(k_\xi, k_\eta, z_{pred}; f')$. The third wavenumber spectrum $P_x(k_x, k_y, z_{pred}; f)$ is on the reference coordinate system and thus is converted to the fourth wavenumber spectrum $P_\xi(k_\xi, k_\eta, z_{pred}; f')$ by reversely performing the foregoing operation.

That is, the conversion between the third and fourth wavenumber spectrums is equivalent to re-arrangement of spectrum components.

A component of the third wavenumber spectrum $P_x(k_x, k_y, z_{pred}; f)$ moves in the fourth wavenumber spectrum $P_\xi(k_\xi, k_\eta, z_{pred}; f')$ according to $k_\xi = k_x$, $k_\eta = k_y$, and $$f' = f - \frac{k_\xi}{2\pi}U = f - \frac{k_\xi}{2\pi}(U_h - U_m).$$

That is, although the component 602 on the reference coordinate system has an equal wavenumber to that of the component 601 on the moving coordinate system, the frequency band of the wavenumber changes to $\omega$, not $\omega'$.

The relationship between the third wavenumber spectrum $P_x(k_x, k_y, z_{pred}; f)$ and the fourth wavenumber spectrum $P_\xi(k_\xi, k_\eta, z_{pred}; f')$ is expressed as $$P_\xi(k_\xi, k_\eta, z_{pred}; f') = P_x\left(k_x, k_y, z_{pred}; f - \frac{k_\xi}{2\pi}(U_s - U_m)\right) \quad \text{[Equation 2]}$$

The above-described technique is related to accurate prediction of acoustic fields according to a relative movement of the source plane, the medium, or the hologram plane. The relative movement may be quantitated in various conventional ways, which will not be described in detail herein.

The exemplary embodiment of the present invention illustrated in FIG. 5 has been described above in the context of a plurality of equations representing the respective steps, that is, the step of converting sound pressures to a wavenumber spectrum, the step of converting the wavenumber spectrum to a wavenumber spectrum on a reference coordinate system, the step of converting the wavenumber spectrum on the reference coordinate system to a wavenumber spectrum on the prediction plane by an acoustic wave propagation theory, the step of converting the wavenumber spectrum on the prediction plane to a wavenumber spectrum on a moving coordinate system, and the step of converting the converted wavenumber spectrum to sound pressures. However, it is clearly understood to those skilled in the at that a plurality of equations corresponding to respective steps may be replaced with one or more integrated equation Therefore, it may be said that a technique for predicting acoustic fields using the integrated equation (including a matrix) is a simple modification of the present invention.

A major example of substituting a single equation for a plurality of equations, Statistically Optimized Nearfield Acoustic Holography (SONAH) will be described. Equations 3 and 4 describe an exemplary Fourier transform and inverse Fourier transform with respect to the Cartesian coordinate system.

$$P(k_x, k_y, z; f) = F\{p(x, y, z; t)\} \quad \text{[Equation 3]}$$
$$= \int_{-\infty}^{\infty}\int_{-\infty}^{\infty}\int_{-\infty}^{\infty} p(x, y, z; t)$$
$$e^{j2\pi ft}e^{-j(k_xx+k_yy)}dt\,dx\,dy$$

$$p(x, y, z; t) = F^{-1}\{P(k_x, k_y, z; f)\} \quad \text{[Equation 4]}$$
$$= \frac{1}{(2\pi)^2}\int_{-\infty}^{\infty}\int_{-\infty}^{\infty}\int_{-\infty}^{\infty} P(k_x, k_y, z; f)$$
$$e^{-j2\pi ft}e^{-j(k_xx+k_yy)}df\,dk_x\,dk_y$$

A Fourier transform and inverse Fourier transform may be expressed as matrices in a discrete domain. In this case, the matrix corresponding to a Fourier transform may be represented as F and the matrix corresponding to an inverse Fourier transform may be represented as $F^{-1}$. Meanwhile, a matrix corresponding to a reference to moving coordinate system conversion based on an acoustic wave propagation theory may be represented as T. In this case, sound pressure on the measurement plane and sound pressure on the prediction plane is placed in the following relationship.

$$p(x_{pred}, y_{pred}, z_{pred}; f) = F^+ T F p(x_h, y_h, z_h; f) \quad \text{[Equation 5]}$$

In this case, three matrices may be converted to a single matrix T'.

$$p(x_{pred}, y_{pred}, z_{pred}; f) = F^+ T F p(x_h, y_h, z_h; f) \quad \text{[Equation 6]}$$
$$= T' p(x_h, y_h, z_h; f)$$

The single matrix T' described in Equation 6 is no more than a conversion of the plurality of equations proposed in accordance with the exemplary embodiment of the present invention. It may be said that the technique for predicting acoustic fields on a prediction plane using Equation 6 falls within the scope of the present invention.

The specific equations described above in the exemplary embodiment of the present invention are used for illustrative purposes only, to which the present invention is not limited.

As is apparent from the above description, the exemplary embodiments of the present invention provide a technique for analyzing acoustic fields on the same coordinate system for which a relative movement is compensated for by representing a relative movement of another coordinate system with respect to the coordinate system of a medium.

Therefore, acoustic fields can be accurately predicted on a prediction plane, even when a sound plane, a hologram plane, or a medium makes a relative movement on various coordinate systems (the Cartesian coordinate system, a cylindrical coordinate system, a spherical coordinate system, etc.).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for predicting acoustic fields on a prediction plane by measuring sound waves emitted from a sound source to a medium on a measurement plane that makes a relative movement with respect to the sound source, the system comprising:

a microphone array having a plurality of microphones, for measuring sound waves on the measurement plane; and an acoustic field prediction module for predicting acoustic fields on the prediction plane using the measurements received from the microphone array, wherein the acoustic field prediction module acquires a first wavenumber spectrum on the measurement plane according to a moving coordinate system, converts the first wavenumber spectrum to a second wavenumber spectrum on a reference coordinate system using a relative velocity between the measurement plane and the medium, converts the second wavenumber spectrum to a third wavenumber spectrum on the prediction plane using an acoustic wave propagation theory, converts the third wavenumber spectrum to a fourth wavenumber spectrum on a moving coordinate system using a relative velocity between the medium and the prediction plane, and computes acoustic fields on the prediction plane using the fourth wavenumber spectrum.

2. The system according to claim 1, wherein the acoustic field prediction module acquires the first wavenumber spectrum by performing a time-space Fourier transform on sound pressures measured on the measurement plane.

3. The system according to claim 1, wherein the acoustic field prediction module computes the acoustic fields on the prediction plane by performing a time-space inverse Fourier transform on the fourth wavenumber spectrum.

4. The system according to claim 1, wherein the prediction plane is a sound source plane corresponding to the sound source.

5. The system according to claim 1, wherein if a velocity of the medium is $U_m$ and a velocity of the measurement plane is $U_h$, with respect to a Cartesian coordinate system, two different frequencies are f' and f, and the first wavenumber spectrum is $P_\xi(k_\xi, k_\eta, \zeta_h; f')$, the acoustic field prediction module computes the second wavenumber spectrum $P_x(k_x, k_y, z_h; f)$ by $$P_x(k_x, k_y, z_h; f) = P_\xi\left(k_\xi, k_\eta, \zeta_h; f' + \frac{k_\xi}{2\pi}(U_h - U_m)\right).$$

6. The system according to claim 1, wherein if a velocity of the medium is $U_m$ and a velocity of the prediction plane is $U_s$, with respect to a Cartesian coordinate system, two different frequencies are f' and f, and the third wavenumber spectrum is $P_x(k_x, k_y, z_{pred}; f)$, the acoustic field prediction module computes the fourth wavenumber spectrum $P_\xi(k_\xi, k_\eta, z_{pred}; f')$ by $$P_\xi(k_\xi, k_\eta, z_{pred}; f') = P_x\left(k_x, k_y, z_{pred}; f - \frac{k_\xi}{2\pi}(U_s - U_m)\right).$$

* * * * *

UNITED STATES PATENT AND TRADEMARK OFFICE
CERTIFICATE OF CORRECTION

PATENT NO.        : 8,371,172 B2
APPLICATION NO.   : 12/482636
DATED             : February 12, 2013
INVENTOR(S)       : Hyu-Sang Kwon It is certified that error appears in the above-identified patent and that said Letters Patent is hereby corrected as shown below:

In the Claims:

Column 10, Line 38, Claim 5, delete " $P_x(k_x, k_y z_h; f)$ " and insert -- $P_x(k_x, k_y, z_h; f)$ --

Signed and Sealed this
Seventh Day of May, 2013

Teresa Stanek Rea
*Acting Director of the United States Patent and Trademark Office*